United States Patent [19]

Mermelstein

[11] 3,909,302
[45] Sept. 30, 1975

[54] VENT CAP FOR BATTERIES

[75] Inventor: Seymour Mermelstein, Newton, Mass.

[73] Assignee: Tyco Laboratories, Inc., Waltham, Mass.

[22] Filed: June 21, 1973

[21] Appl. No.: 372,216

[52] U.S. Cl. ............................... 136/177; 55/158
[51] Int. Cl.² ...................................... H01M 2/12
[58] Field of Search ............... 136/133, 177–179; 92/102; 220/44 C; 55/158

[56] References Cited
UNITED STATES PATENTS

| | | | |
|---|---|---|---|
| 2,650,673 | 9/1953 | Bering et al. | 220/44 OR |
| 2,964,124 | 12/1960 | Peierls et al. | 55/158 X |
| 3,143,441 | 8/1964 | Coleman et al. | 136/133 X |
| 3,214,300 | 10/1965 | Nordvik | 136/178 |
| 3,218,197 | 11/1965 | Carmichael et al. | 136/133 |
| 3,336,843 | 8/1967 | Griswold | 92/102 X |
| 3,436,273 | 4/1969 | Gratzmuller | 136/178 |
| 3,507,708 | 4/1970 | Vignaud | 136/177 |
| 3,614,856 | 10/1971 | Sanz et al. | 55/158 X |
| 3,647,557 | 3/1972 | Kegelman | 136/177 |
| 3,668,837 | 6/1972 | Gross | 55/158 |
| 3,706,617 | 12/1972 | Stark et al. | 136/178 |
| 3,822,601 | 7/1974 | Borom | 55/158 X |

FOREIGN PATENTS OR APPLICATIONS 1,470,680  2/1967  France .............................. 220/44 A Primary Examiner—Allen B. Curtis
Assistant Examiner—Thomas A. Waltz
Attorney, Agent, or Firm—Schiller & Pandiscio

[57] ABSTRACT

The invention is a new vent cap for a liquid acid electrolyte storage cell. The vent cap comprises a diaphragm or membrane that is permeable to oxygen and hydrogen gas and substantially impermeable to the liquid electrolyte. Means are provided for fixedly securing the diaphragm in the vent cap assembly.

11 Claims, 1 Drawing Figure

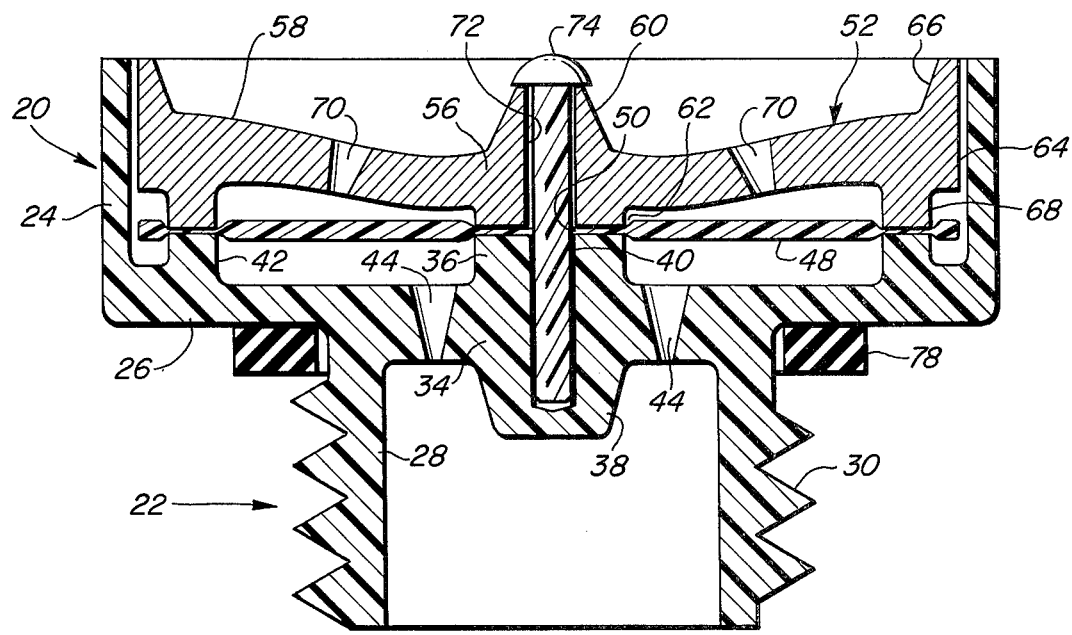

VENT CAP FOR BATTERIES

This invention relates to electrochemical storage cells and more particularly to a novel vent cap for a battery of the liquid acid electrolyte type.

Electrochemical storage cells of the liquid acid electrolyte type may produce oxygen and hydrogen gas during periods of rapid charging or overcharging. To avoid damage and/or injury due to excessive internal pressure build-up, the cell should be adapted to vent such gases. On the other hand, the cell obviously should not leak electrolyte. Preferably the cell should be adapted to vent such gases before the pressure exceeds about 3–5 psig.

The primary object of this invention is to provide a new vent cap for batteries of the type employing a liquid acid electrolyte.

A further object is to provide a battery vent cap which is capable of venting oxygen and hydrogen gas but is substantially leak resistant to liquid sulfuric acid.

Still another object is to provide such a battery vent cap that is relatively simple and inexpensive to manufacture, and that is easy to assemble.

The foregoing and other objects are achieved by a preferred embodiment of the invention which consists of a vent cap assembly that includes a diaphragm or membrane which is permeable to oxygen and hydrogen gas and substantially impermeable to sulfuric acid electrolyte. The membrane is in the form of a thin microporous polytetrafluorethylene membrane of selected pore size.

Other features and many of the attendant advantages of the invention are described or rendered obvious by the following detailed description which is to be considered together with the accompanying drawing wherein there is illustrated a cross-sectional view in elevation of an exemplary vent cap formed according to principles of the present invention.

Referring now to the drawing, the illustrated embodiment of the invention comprises a vent cap body having a main cup section 20 and a reduced diameter stem section 22. The main cup section 20 comprises a cylindrical wall 24 and an end wall 26. The stem section 22 comprises a cylindrical wall 28 formed integral with end wall 26 and is adapted, preferably by provision of a screw thread 30 formed on its outer surface, for mounting in an opening in a battery case. Typically the opening is a battery filling opening leading to a cell of the battery.

Wall 26 is formed with a circular hub 34 at its center. Hub 34 projects above and below wall 26 as shown at 36 and 38. The upper surface of hub 34 is flat as shown and functions as a flange or shoulder. The hub is provided with a blind center hole 40. Also formed integral with the upper side of wall 26 is an annular rib or flange 42 which is concentric with cylindrical walls 24 and 28. Rib 42 is located relatively close to but is spaced from cylindrical wall 24. Preferably the thickness of wall 26 is increased between rib 42 and wall 24 as shown to provide increased stiffness. Lastly wall 26 is provided with one or more vent holes 44 which provide fluid communication between sections 20 and 22.

The vent cap body just described is made of a suitable electrolyte-resistant material. For a conventional lead-acid battery the vent cap body may be made of stainless steel or a suitable plastic such as polystyrene, an acrylic resin, or acrylonitrile butadiene styrene. Preferably it is molded of a polycarbonate material.

Disposed within cup section 20, and supported above wall 26 on hub 34 and rib 42 is a diaphragm or membrane 48. Membrane 48 is circular and is dimensioned so that there is a relatively small space between its periphery and the inside surface of cylindrical wall 26. Membrane 48 has a hole 50 located at its center in alignment with blind hole 40.

The nature of the membrane is critical. Membrane 48 must be permeable to permit venting of such gases as may be produced in the battery during periods of rapid charging or overcharging. However, the membrane must be hydrophobic and substantially impermeable to liquid electrolyte so that the battery will not leak via the vent cap when it is tilted or turned upside down as frequently occurs during use or handling. Moreover the membrane also must be resistant to chemical attack by the electrolyte. Thus in the case of conventional lead-acid batteries, the membrane must also be resistant to the sulfuric acid electrolyte and also must be substantially impermeable to the same. Additionally it must be permeable to hydrogen and oxygen gases which may be produced when the battery is recharged.

In accordance with this invention, the membrane 48 is made of a microporous polytetrafluorethylene sheet or sheets. Such material is available and satisfies the above criteria for the membrane.

In a preferred embodiment of the invention, the membrane is made of a microporous polytetrafluorethylene sheet having an average pore size in the range of from about 2 to about 10 microns (preferably from about 5 to about 10 microns), and a thickness in the range of 0.005 to 0.030 inches. Such a membrane has been found to permit relatively rapid venting of oxygen and hydrogen gas, and to be highly resistant to attack by sulfuric acid electrolyte. Additionally, and depending upon pore size, it is substantially impermeable or only slightly permeable to sulfuric acid electrolyte in the concentrations normally employed in lead-acid batteries. By way of example, the membrane may comprise a 0.005 inch thick sheet of Zitex brand of polytetrafluorethylene sold by Chemplast, Inc., of Wayne, N.J. The manufacturer describes such material as having a pore size in the range of about 5 to about 10 microns.

In this connection it is to be noted that a difference in the degree of impermeability to sulfuric acid electrolyte has been discovered between a polytetrafluorethylene membrane with pores in the range of about 2 to about 5 microns and one with pores in the range of from about 5 to about 10 microns. A vent cap made according to this invention using a membrane with pores of 2–5 microns will exhibit no leakage of electrolyte indefinitely under the normal static head of battery electrolyte with the battery inverted so that the vent cap faces down. However, the membrane will be wet by the electrolyte so that the latter will tend to fill the pores of the membrane. Hence, if subsequently the battery is put right side up and pulsed with a heavy charging current, some gas pressure buildup will occur until the pressure is great enough to force the electrolyte out of the pores. Typically, however, the liquid is expelled from the pores before the gas pressure buildup exceeds about 3–5 psig. Nevertheless, this expulsion of liquid may be slow and if gas generation occurs rapidly, the pores may not be substantially fully purged of electrolyte before the pressure begins to exceed about 3–5 psig. This limitation is avoided if the membrane has pores in the range of about 5–10 microns. A vent cap with the latter mambrane has been found to vent gases under all conditions before the gas pressure reaches 3–5 psig. However, if the battery is inverted, sulfuric acid electrolyte will wet the membrane, and after about 3 days or more the electrolyte will begin to permeate the membrane and drip slowly out from the vent cap. When the battery is turned right side up, any liquid trapped in the pores of the membrane rapidly drains back into the battery or is expelled rapidly by gases generated during subsequent recharging of the cell. In view of the above, it is preferred that the vent cap embody a membrane as described having a pore size in the range of about 5 to about 10 microns. As a second preference, the membrane may have pores with varying sizes in the range of from about 2 to about 10 microns with an average pore size in the range of about 5 to 10 microns. Pore sizes in excess of about 10 microns are unsuitable for sulfuric acid electrolyte in the concentrations conventionally used in lead-acid storage batteries since the electrolyte will readily permeate the membrane and the vent cap will begin to leak within several hours and even minutes if the battery is turned upside down.

As is well known, polytetrafluorethylene material is difficult to bond by normal bonding techniques, i.e., solvent, ultrasonic, and fusion bonding procedures are not greatly satisfactory. Furthermore, most known adhesives do not bond well to such material. Accordingly in the present invention a mechanical clamping technique is employed to secure the membrane to the vent cap body. Referring again to the drawing, membrane 48 is clamped to the vent cap body by means of a stiff yet flexible member 52 which also acts as a protective cover for the membrane.

Member 52 is in the form of a circular disk having a central hub 56 which projects above and below its web portion 58 as shown at 60 and 62. The lower portion 62 serves as a flange or shoulder and thus has a flat bottom surface with about the same diameter as the upper portion 36 of hub 34. Retaining member 52 is dimensioned so that there is a narrow annular gap between its cylindrical outer surface 64 and the inside surface of wall 24. Retaining member 52 also is formed with a peripheral tapered rim 66 on its upper side and an annular flange or rib 68 on its bottom side. Flange 68 is concentric with hub 56 and its inside and outside diameters are substantially the same as those of flange 42. The confronting end surfaces of flanges 42 and 68 are flat as shown. Member 52 includes one or more vent holes 70 in web portion 58. The hub 56 of retaining member 52 is formed with a center hole 72 to receive a fluted drive pin or threaded drive screw 74 which extends into hole 40 and frictionally engages hub 34 so as to lock the retaining member in place.

Notwithstanding its deflected appearance in the drawing, retaining member 52 is formed so that in its as-formed or relaxed state (a) its web portion 58 is flat and extends at a right angle to its axis of symmetry, i.e. at a right angle to its cylindrical outer wall 64, and (b) the bottom end surface of hub 56 resides in a plane that is parallel to but above the plane of the bottom end surface of flange 68. Preferably retaining member 52 is formed so that the bottom end surface of hub 56 is located about 3/16–5/16 inch above the corresponding end surface of flange 68. The web portion 58 may have a constant thickness but preferably its thickness decreases with decreasing distance from hub 56 so as to facilitate flexing as illustrated and as hereinafter described.

Retaining member 52 is formed of a material that is highly resistant to chemical attack by the acid electrolyte. Additionally as noted it is required to be relatively stiff and incompressible, yet capable of being flexed. A member of different materials will satisfy this requirement, including certain stainless steels and certain plastics such as polycarbonates, polyethylene, rigid polyvinyl type plastics, and polyacrylates. It is preferred that the plastic material have a hardness of about Rockwell M70 and a modulus of elasticity of about $3.5 \times 10^5$ psi. Preferably the retaining member is made of a transparent polycarbonate.

In assembling the device, membrane 48 is placed inside section 20 of the vent cap and positioned on flange 42 and the upper end of hub 34 with its center hole 50 aligned with blind hole 40. Then retaining member 52 is placed over the membrane and positioned so that its hole 72 is aligned with holes 40 and 50. Then the screw or pin 74 is pushed through holes 72 and 50 and threaded or driven into hole 40. The fastener is forced down into hole 40 far enough for the bottom end surface of the hub 56 to compress and clamp the center portion of the membrane between it and hub 34. This action forces flange 68 to compress and clamp the membrane near its outer margin to flange 42. It is to be noted that web portion 58 of the retaining member is required to flex as shown in order to permit the hub 56 to be drawn into clamping relation with the membrane and hub 34. As a consequence the magnitude of the clamping force exerted by flange 68 on the membrane is a function of the stiffness of the retaining member and the amount of deflection required to bring hub 56 down into compressing relation with the membrane. The pin is driven in far enough to cause flange 68 and hub 56 of retainer 52 and flange 42 and hub 36 of the vent cap body to clamp the membrane tight enough to compressively deform it as shown so as to make a liquid-tight seal at its inner and outer margins and also so that it will not pull free under the gas pressure that may be generated in the cell being vented or under the static pressure head of the electrolyte when the battery is inverted. It is to be noted that the outer diameter of the membrane is larger than that of flanges 42 and 68, with the result that the membrane will bulge at its periphery as shown when it is compressively deformed by and between the two flanges. This bulging of the membrane enhances the membrane holding or locking ability of the assembly. This vent cap assembly is mounted to a battery cell (each cell may be fitted with a vent cap as above described) by means of screw thread 30. Preferably a gasket or O-ring 78 is employed to prevent leakage of electrolyte out from between the stem section of the vent cap and the battery case.

The primary advantages of the inventions are quite clear. The vent cap is cheap and easy to make and assemble. The membrane is adequately secured by purely a mechanical clamping action, thereby avoiding the problems attendant to bonding one member to another by chemical means or by ultrasonic or electrical heating techniques. The membrane is replaceable. In this connection it is to be noted a self-tapping screw may be used to secure the retainer member 52 in place, thereby avoiding the need to preform a screw thread in hole 40. Use of a self-tapping screw is especially feasible if the vent cap body is made of a thermoplastic material. Another advantage is that construction of the vent cap and the method in which the membrane is secured in place permits the use of membranes made of other material now known or hereafter made known to persons skilled in the art, which are electrolyte resistant and have a microporous structure that permits the venting of gases while inhibiting leakage of electrolyte. Thus, for example, microporous polyethylene may be suitable as a diaphragm material for certain battery systems. A further advantage is that relatively large passageways 36 and 70 may be employed to maximize gas flow from the battery into the chamber formed between the membrane and the end wall 26 of the vent cap body and assure a sharp pressure drop across the membrane. Last but not least, the vent cap can be made with a relatively low profile so as to reduce the likelihood of physical damage by an outside force.

Of course the invention is susceptible of modifications. Thus its exterior shape and its overall size can be changed. Furthermore the web portion 58 of the retainer member could be made so as to have a dome shape in its relaxed state, so as to increase the volume of the chamber formed between it and the membrane when it is deformed under the influence of the drive pin or screw as the latter is secured to hub 36. Still other changes will be obvious to persons skilled in the art.

I claim:

1. A vent cap for an electrical cell having a liquid electrolyte comprising: a hollow body adapted to be connected to an opening in said cell leading to said electrolyte;
   a membrane disposed in and extending across the interior space of said hollow body;
   first and second concentric membrane support members within and attached to said hollow body, said support members being spaced radially from one another; and
   means frictionally securing said membrane to said first and second membrane support members so that the membrane extends between said support members, said support members being spaced apart sufficiently so that a substantial area of said membrane is exposed to gases and electrolyte within said cell;
   said membrane being made of a material that is permeable to gases generated within said cell and serves as a barrier to flow of electrolyte through said body, said material comprising a microporous polytetrafluorethylene sheet with a pore size in the range of about 2 to about 10 microns.

2. A vent cap according to claim 1 wherein said membrane support members are disposed so as to support said membrane at its center and also at its periphery.

3. A vent cap according to claim 1 wherein said membrane has pores with a pore size in the range of about 5 to about 10 microns.

4. A vent cap according to claim 1 wherein said means for securing said membrane to said support members comprises a retainer member disposed within and secured to said body, said retainer member having openings for venting gas passing through said membrane.

5. A battery cap assembly for a battery of the liquid acid electrolyte type comprising in combination:
   a tubular enclosure;
   a wall extending across the interior of and integral with said enclosure;
   said wall being formed with one or more openings therethrough and including at least two spaced flanges with at least one of said flanges being formed adjacent the periphery of said wall;
   a membrane formed of a material that is substantially permeable to hydrogen and oxygen gas but substantially impermeable to liquid acid electrolyte, said material comprising a microporous sheet having a pore size in the range of about 2 to about 10 microns, said membrane being disposed within said enclosure and supported on said flanges;
   a retainer member mounted within and secured to said tubular enclosure, said retainer member overlying said membrane and having (a) projecting means for clamping selected portions of said membrane to said flanges whereby to secure said membrane to said enclosure, and (b) one or more openings for venting gas passing through said membrane; and
   means for securing said retaining member to said wall.

6. A battery cap assembly as defined in claim 5 wherein said projecting means are formed integral with said retainer member.

7. A battery cap assembly as defined in claim 5 wherein said selected portions of said membrane are compressively deformed by the clamping action of said projecting means.

8. A battery cap assembly as defined in claim 5 wherein said retainer member is secured to said wall at a single point by a fastener which is anchored in said wall, and said retainer member is deformed radially of said single point.

9. A vent cap for an electric cell containing a liquid electrolyte comprising:
   a hollow body having an inlet and an outlet for gases escaping from an opening in said cell leading to said electrolyte and having a portion adapted for connecting said inlet to an opening in said cell; said body also having first and second radially spaced concentric projections in its interior between said inlet and outlet;
   a membrane retainer member disposed within said body and having third and fourth radially spaced concentric projections aligned with said first and second projections respectively, said retainer member having at least one opening for passing gas from said inlet to said outlet;
   a membrane formed of a material that is substantially permeable to hydrogen and oxygen gas but substantially impermeable to said liquid electrolyte, said membrane being disposed within and extending transversely of said hollow body with a first outer portion thereof extending between said first and third projections and a second inner portion thereof extending between said second and fourth projections thereof; and
   means for securing said retainer member to said hollow body so that said member iis clamped between the projections of said body and the projections of said retainer member.

10. A vent cap according to claim 9 wherein said last-mentioned means is a pin that is locked to said body and said retainer member and extends through said membrane.

11. A vent cap according to claim 9 wherein said retainer member comprises a web portion between said third and fourth projections, said web portion being flat in its as-formed state and being deformed radially between said third and fourth projections when said retainer member is in its as-secured position within said body.

* * * * *